3,057,750
Patented Oct. 9, 1962

3,057,750
PROCESS FOR REINFORCING A PREFORMED ELASTOMER FOAM
Bailey Bennett and Louis E. Novy, Columbus, Ohio, and Frank A. Simko, Jr., Wilmington, Del., assignors, by direct and mesne assignments, to E. I. du Pont de Nemours and Company, Wilmington, Del., a corporation of Delaware
No Drawing. Filed Dec. 16, 1958, Ser. No. 780,679
4 Claims. (Cl. 117—98)

This invention relates to compositions and processes for reinforcing elastomer foams and is more particularly directed to such compositions comprising an aquasol of substantially discrete silica particles 5 to 150 millimicrons in average dimension and an organic, non-elastomeric film former selected from the group consisting of polyvinyl butyral, polyvinyl formal, copolymers of a major proportion of vinyl acetate and a minor proportion of crotonic acid, and dispersions of polyamides, and is further particularly directed to processes in which an elastomer foam is brought into contact with such an organic, non-elastomeric film former-colloidal silica composition and the treated foam is thereafter dried, whereby the foam is reinforced.

A simplified flow diagram of the process is as follows:

---
Preformed elastomer foam
---
|
---
Bringing foam into contact with composition comprising:
   (1) aqueous sol of 5–150 mμ silica particles and
   (2) organic film former of stated class
---
|
---
Drying treated foam
---

That elastomer foams can be reinforced with colloidal silica has already been shown in Iler U.S. Patent 2,760,941. When it is attempted to make such reinforced foams by dipping the preformed foam in a solution of colloidal silica and drying the treated product, however, the reinforcement is not as high as is desired. Since it is obviously important to make the reinforcing action as high as possible, methods have been considered for modifying the treatment to enhance the reinforcement, but no satisfactory method hitherto has been found. The incorporation of elastomeric materials with the silica sol treatment, for instance, either leaves the product sticky and unsuitable for its intended use or requires a carefully controlled subsequent curing step. The latter alternative adds materially to the cost of the treatment; hence, the use of elastomeric materials for this purpose has not been a practicable solution of the problem.

Now according to the present invention it has been found that the above-mentioned reinforcement can be augmented by including in the silica sol used for the dip treatment an organic, non-elastomeric film former selected from the group consisting of polyvinyl butyral, polyvinyl formal, polyvinyl alcohol, copolymers of a major proportion of vinyl acetate and a minor proportion of crotonic acid, and dispersions of polyamides. These non-elastic materials do not require a separate curing step after the treatment, mere drying of the treated product being sufficient. Moreover, the properties of the treated foam are substantially unaltered except that the reinforcing action of the silica sol is enhanced.

Processes of the invention are broadly applicable to the treatment of any elastomer foam. The term "elastomer" is used herein in its accepted meaning as defined, for instance, at page 30 of the Modern Plastics Encyclopedia, 1950 edition: "A material which at room temperature can be stretched repeatedly to at least twice its original length and upon immediate release of the stress, will return with force to its approximate original length."

Included among the elastomers, foams of which can be treated according to the invention, are the high molecular weight, natural caoutchouc, as well as synthetic rubbers and rubber-like materials such as neoprene, butyl rubber, and the styrene-butadiene copolymer known as GR–S. More particularly, some of the elastomers included are butadiene copolymerized in various ratios with styrene, butadiene copolymerized in various ratios with acrylonitrile, polymerized butadiene, polymerized 2,3-dimethyl butadiene, polymerized 2-chlorobutadiene, 1,3-isobutylene copolymerized with isoprene, copolymers of butadiene and methylmethacrylate, butadiene copolymerized with methylvinyl ketone, and various other copolymers of butadiene with ethylenic-unsaturated hydrocarbons. It will be noted that the invention is applicable to diene elastic polymers as a class.

The art is, of course, familiar with various ways of making foams from such elastomers, and these methods constitute no part of the present invention.

The silica aquasols used in making compositions of the present invention are similarly well known in the art. It will be understood that while the sols are referred to as "aquasols" the continuous phase can consist in part of an organic liquid. Thus, the so-called "aqua-organo" sols can be used, sometimes to advantage.

The discontinuous phase of the silica sol comprises substantially discrete particles 5 to 150 millimicrons in average dimension. If the particles are spherical, all three dimensions are equal and are the same as the average. For anisotropic particles the size is considered to be one third of the sum of the three particle dimensions. For example, an aggregate consisting of three spheres joined together in a straight line might be 30 millimicrons long but only 10 millimicrons wide and thick. The size of this particle is $$\frac{30+10+10}{3}$$

or 16.7 millimicrons.

The discrete particles in the sol can consist of aggregates of ultimate particles as just noted, provided the aggregates are in the range of 5 to 150 millimicrons in size. It is far preferred, however, to use sols in which the particles are substantially discrete, dense ultimate particles of the stated size range. The fact of whether or not a sol contains particles of the type herein described can be readily ascertained by techniques with which the art is already familiar. Thus, the size can be determined directly by electron microscope examination or can be inferred from surface area measurements. The discreteness can also be inferred from relative viscosity measurements, sols which are highly viscous being in a high degree of aggregation and hence being avoided.

Silica sols of the type here preferred are already well known in the art, being described, for example, in Bechtold et al. U.S. Patent 2,574,902, Alexander U.S. Patent 2,750,345, and Rule U.S. Patent 2,577,485. Sols prepared as described in White U.S. Patent 2,375,738, Trail U.S. Patent 2,573,743 and Legal U.S. Patent 2,724,701 can also be used provided the degree of aggregation of the particles is not so great as to place them outside the above-mentioned limitations.

In the compositions of the present invention the silica sol will constitute the major proportion—that is, will be upwards of 50 percent by weight of the total. Based on the weight of silica, as $SiO_2$, the organic film former will preferably comprise about from 5 to 45 percent by weight, from about 10 to 20 percent being preferred. It is particularly preferred in such compositions to use a silica sol of the type described in Example 3 of the above-mentioned Bechtold and Snyder Patent 2,574,902. Such sols, as commercially available, contain about 30 percent $SiO_2$ by weight.

The non-elastomeric film former used in processes of the invention is selected from the group consisting of polyvinyl butyral, polyvinyl formal, polyvinyl alcohol, copolymers of a major proportion of vinyl acetate and a minor proportion of crotonic acid, and dispersions of nylon. All of these materials are either water soluble or water dispersible. In the case of nylon, for instance, the nylon is first dissolved in a solvent such as toluene and the toluene solution is then emulsified.

In making the compositions of the invention the silica sol and the film former are brought together in a manner such that the film former and colloidal silica remain dispersed in the continuous liquid phase. Thus, in the case of nylon just mentioned, the nylon is first dissolved in a solvent and then mixed with the silica sol in the presence of sufficient emulsifying agent to keep the nylon dispersed. In the case of water-soluble polymers the film former can be dissolved directly in the silica sol if desired.

It will be understood that the silica sol-film former composition may additionally contain modifying agents such as surfactants to aid in keeping the solids suspended and to promote wetting of the elastomer by the treating solution. The art is familiar with surfactants for use in such systems, the following being representative:

"Tergitol 7"; anionic, sodium sulfate derivative of 3,9-diethyl tridecanol; Union Carbide and Carbon Co.
"Ethomeen C/15"; cationic, ethylene oxide condensation product of cocoa amine; Armour.
"Ultrapole DL"; nonionic, lauroyl diethanolamine amid; Ultra Chemical Works.
"Triton X-100"; nonionic, alkyl aryl polyether alcohol; Rohm and Haas Company.
"Tween 20"; nonionic, polyoxyethylene sorbitan monolaurate; Atlas Powder Company.

In the case of vinyl acetate-crotonic acid copolymers a copolymer consisting of 95 percent of the vinyl acetate and 5 percent of the crotonic acid has been found to be particularly effective.

In processes of the invention the preformed elastomer foam is brought into contact with the film former-silica sol composition and the treated material is thereafter dried, whereby reinforcement of the foam is effected.

Such contact can be very conveniently accomplished by squeezing and releasing the foam while it is submerged in a bath of the treating composition, but it will be understood that other means, such as spraying the treating solution onto the foam or applying it with a doctor roll, are also suitable. A very practical method consists of flooding the foam with the treating solution as it exits from a squeeze roll, so that the solution is pulled into the foam, and then passing the foam through another squeeze roll to remove excess solution.

Ordinarily the process will be controlled so that the silica pick-up of the elastomer foam is in the range of 0.5 to 10 percent by weight of $SiO_2$ based on the weight of elastomer, a pick-up of 1 to 6 percent being especially preferred. Such control can be exercised by varying the concentration of the treating bath or by limiting the amount of treating composition picked up.

After the treatment the product is dried, as in a circulating air oven. Drying should be continued until all of the liquid picked up has been evaporated. The temperature should be lower than that which will lead to scorching of the foam. There is no need for a prolonged heating step after drying because with the film formers herein described no supplemental curing is needed.

The invention will be better understood by reference to the following illustrative examples.

EXAMPLE 1

A treating composition was made up using as the silica sol a colloidal aquasol containing 30 percent $SiO_2$ and commercially available as "Ludox" HS. To this silica sol was added a non-elastomeric film former known commercially as "Elvalan," a copolymer consisting of 95 percent by weight of vinyl acetate and 5 percent of crotonic acid. There was also added 0.5 percent by weight of ammonia based upon the weight of "Elvalan."

These compositions were diluted with water to contain 10 percent $SiO_2$ with 5 and 2 percent respectively of "Elvalan," and 5 percent $SiO_2$ with 1.25 percent "Elvalan."

The treating solution was used for reinforcing latex rubber foam by dipping a piece of the foam weighing 50 to 300 grams into 2000 grams of the treating solution, flexing the foam while submerged by passing a roller back and forth over it, removing the treating solution and wringing the foam to 50 to 60 percent moisture based on the dry weight of the foam. Thus, depending upon the concentration of the colloidal silica in the treating bath, between 2 and 5 percent of silica solids was deposited on the foam during the drying process.

The modulus, i.e., the load-bearing capacity at specified deflection—in this case, 25 percent, in pounds per square inch, was determined on the foam before and after treatment. From the increase in modulus the percent of reinforcement was calculated.

The results were as follows:

| Treating System | 10% Silica | 10% Silica Plus 5% Elvalan | 10% Silica Plus 2% Elvalan | 5% Silica Plus 1.25% Elvalan |
|---|---|---|---|---|
| Dry Gain, percent | 3.5 | 6.5 | 4.9 | 2.4 |
| Pretreat Modulus, p.s.i., at 25% deflection | 0.336 | 0.336 | 0.336 | 0.336 |
| Posttreat Modulus, p.s.i., at 25% deflection | 0.527 | 0.680 | 0.680 | 0.545 |
| Reinforcement, percent | 57.0 | 102.0 | 102.0 | 63.0 |

EXAMPLE 2

The procedures of Example 1 were repeated using in place of "Elvalan," a dispersion made by dissolving nylon (a condensation polymer of the polyamide type) in toluene and emulsifying the solution. A test was also made using with the nylon dispersion an equal amount of "Tergitol 7."

The results were as follows:

| Treatment System | 10% Silica | 10% Silica Plus 1% Nylon Dispersion | 10% Silica Plus 1% Nylon Dispersion Plus 1% Tergitol 7 |
|---|---|---|---|
| Dry Gain, percent | 3.4 | 4.4 | 4.4 |
| Pretreat Modulus, p.s.i., at 25% deflection | 0.336 | 0.336 | 0.336 |
| Posttreat Modulus, p.s.i., at 25% deflection | 0.530 | 0.580 | 0.600 |
| Reinforcement, percent | 58.0 | 73.0 | 79.0 |

EXAMPLE 3

An elastomer foam, containing 70 percent by weight of natural rubber and 30 percent by weight of styrene-butadiene synthetic rubber, made by the Dunlop process employing sodium silicofluoride as the gelling agent, was used in this example. The foam was in the form of freshly prepared, 60 percent cured, cored automotive topper pads which had not yet been dried after gelation and curing. The pads were cut into pieces 12 x 12 x 2.5 inches.

The treating baths were freshly prepared for each foam sample; they were 6000 cc. in volume and varied in silica concentration from 1.5 to 6.0 percent, depending on the amount desired on the foam. The source of colloidal silica in the baths was a commercial silica aquasol prepared by a process of Bechtold and Snyder U.S. Patent 2,574,902 and containing about 30 percent by weight of silica, as $SiO_2$, in the form of substantially discrete particles having an average particle size of about 17 millimicrons, the sol being alkali stabilized with an amount of sodium base such that the $SiO_2:Na_2O$ weight ratio was about 95:1, this sol being known as "Ludox" HS colloidal silica. The polyvinyl alcohol (PVA) was a completely hydrolyzed product known in the trade as "Elvanol" Grade 72–60. Both the "Ludox" and the "Elvanol" are products of E. I. du Pont de Nemours and Company.

The treating baths which contained only colloidal silica were prepared by dilution of "Ludox" HS with water to the desired concentration. The baths containing one part of PVA solids per six parts of $SiO_2$ were prepared by adding the proper amount of a 6 percent aqueous solution of PVA to the diluted "Ludox." The PVA solutions were prepared by sifting the "Elvanol" slowly into rapidly stirring cold water and then heating the water until a clear, syrupy solution resulted (about five minutes at 90° C.).

The foam samples were treated by immersion and squeezing below the liquid surface in the appropriate treating bath, to insure thorough contact of the treating agent with all the internal cell-wall surfaces of the foam. The foam was then passed through a laundry type wringer, back into the treating bath and through the wringer rolls once again before drying for forty-five minutes at 120° C. in a forced air oven. The treating baths consisted of water, to show the effect of no treatment; dilute colloidal silica, to show the improvement in load-bearing capacity obtainable by silica sol treatment; and a mixture of colloidal silica and polyvinyl alcohol in aqueous solution, the ratio of $SiO_2$ to PVA always being 6 to 1, to show the added effect of the PVA for improving the reinforcing action of the silica on the foam.

The load-bearing capacity of each treated foam piece was determined by the method of ASTM D–1055–58–T, i.e., by measuring the force in pounds required to impress a 50 square in. circular foot into the center of the uncored side of each foam piece a distance equivalent to 25 percent and 50 percent of the foam thickness as measured when the same pressure foot is under a load of one pound. The load-bearing capacity was measured after each foam piece had been fatigued by flexing to 50 percent of its original thickness at a rate of 60 flexes per minute for a total of 250,000 flexes.

The increased load-bearing capacity of the foam samples treated with colloidal silica and PVA-colloidal silica, in relation to the water treated control foam samples, is referred to as foam "reinforcement." A comparison of the reinforcing action of these two treatments has been made in Table 1, below, on a basis which excludes the effect of differences in foam density on load-bearing capacity. The silica content of the treated foam samples was determined by chemical analysis and refers to that silica added by virtue of the treatment.

Percentage reinforcement is the difference in compression resistance between treated and untreated foam of equal density, expressed as a percentage of the compression resistance of the untreated foam.

Percentage rubber savings is the difference in density between treated and untreated foam of equal compression resistance, expressed as a percentage of the density of the untreated foam.

*Table 1.—Reinforcement of Foam Rubber by Treatment With Colloidal Silica and Polyvinyl Alcohol*

[For foam fatigued by flexing 250,000 times]

| Analyzed Percent Silica on Foam | Percent Reinforcement [1] | | Percent Rubber Savings [2] | |
|---|---|---|---|---|
| | Silica Treated | Silica–PVA Treated | Silica Treated | Silica–PVA Treated |
| 1 | 1.5 | 8.0 | 1.0 | 3.5 |
| 2 | 3.0 | 15.5 | 1.5 | 6.5 |
| 3 | 4.5 | 20.5 | 2.2 | 8.1 |

[1] Calculated from load-bearing capacity measured at 50 percent deflection for foam of density 0.075 g./cc.
[2] Calculated from load-bearing capacity measured at 50 percent deflection for foam requiring 22.5 lbs./50 sq. in. to deflect 50 percent.

The above data clearly illustrate the improvement in the reinforcing effect of colloidal silica made by the addition of polyvinyl alcohol to the treating bath. The addition of polyvinyl alcohol to the silica sol in the treating bath did not cause greater foam shrinkage, distortion, or discoloration than was experienced for the water-treated control foam.

We claim:
1. In a process for reinforcing a preformed elastomer foam the steps comprising bringing the preformed foam into contact with a composition comprising upwards of 50% by weight of an aqueous sol of substantially discrete silica particles 5 to 150 millimicrons in average dimension said aqueous sol containing, based on the weight of silica, about 4 to 45% by weight of an organic, non-elastomeric film former selected from the group consisting of polyvinyl butyral, polyvinyl formal, polyvinyl alcohol, and copolymers of a major proportion of vinyl acetate and a minor proportion of crotonic acid, and thereafter drying the treated foam.

2. In a process for reinforcing a preformed elastomer foam the steps comprising bring the preformed foam into contact with a composition comprising upwards of 50% by weight of an aqueous sol of substantially discrete silica particles 5 to 150 millimicrons in average dimension, said aqueous sol containing, based on the weight of silica, about 4 to 45% by weight of a surfactant and an organic, non-elastomeric film former selected from the group consisting of polyvinyl butyral, polyvinyl formal, polyvinyl alcohol, and copolymers of a major proportion of vinyl acetate and a minor proportion of crotonic acid, and thereafter drying the treated foam.

3. In a process for reinforcing a preformed elastomer foam the steps comprising bringing the preformed foam into contact with a composition comprising upwards of 50% by weight of an aqueous sol of substantially discrete silica particles 5 to 150 millimicrons in average dimension, said aqueous sol containing, based on the weight of silica, about 4 to 45% by weight of an organic, non-elastomeric film former which is a copolymer of a major proportion of vinyl acetate and a minor proportion of crotonic acid and thereafter drying the treated foam.

4. In a process for reinforcing a preformed elastomer foam the steps comprising bringing the preformed foam into contact with an aqueous sol of substantially discrete silica particles 5 to 150 millimicrons in average diameter, said aqueous sol containing, based on the weight of silica, about 4 to 45% by weight of an organic, non-elastomeric film former consisting of polyvinyl alcohol.

References Cited in the file of this patent

UNITED STATES PATENTS

| | | |
|---|---|---|
| 2,701,218 | Nickerson | Feb. 1, 1955 |
| 2,760,941 | Iler | Aug. 28, 1956 |
| 2,926,390 | Talalay et al. | Mar. 1, 1960 |
| 2,955,958 | Brown | Oct. 11, 1960 |